(12) United States Patent
Pittenger et al.

(10) Patent No.: US 8,584,005 B1
(45) Date of Patent: Nov. 12, 2013

(54) PREVIEWING REDACTION CONTENT IN A DOCUMENT

(75) Inventors: Jason T. Pittenger, San Francisco, CA (US); David Stromfeld, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2029 days.

(21) Appl. No.: 11/477,041

(22) Filed: Jun. 28, 2006

(51) Int. Cl.
G06F 17/00 (2006.01)

(52) U.S. Cl.
USPC ............ 715/233; 715/230; 715/273; 715/274

(58) Field of Classification Search
USPC .......... 715/200, 230–233, 254–257, 274–277
See application file for complete search history.

(56) References Cited

U.S. PATENT DOCUMENTS

| | | | |
|---|---|---|---|
| 6,279,014 B1 * | 8/2001 | Schilit et al. ................... | 715/234 |
| 6,397,194 B1 * | 5/2002 | Houvener et al. ............... | 705/16 |
| 6,671,684 B1 * | 12/2003 | Hull et al. ......................... | 707/6 |
| 6,684,369 B1 * | 1/2004 | Bernardo et al. ............. | 715/205 |
| 6,859,909 B1 * | 2/2005 | Lerner et al. .................... | 715/203 |
| 7,130,858 B2 * | 10/2006 | Ciaramitaro et al. ................. | 1/1 |
| 7,428,701 B1 * | 9/2008 | Gavin et al. ..................... | 715/243 |
| 7,536,635 B2 * | 5/2009 | Racovolis et al. ............. | 715/229 |
| 7,712,029 B2 * | 5/2010 | Ferreira et al. ................. | 715/256 |
| 2004/0034835 A1 * | 2/2004 | Kuruoglu et al. ............. | 715/530 |
| 2004/0049294 A1 * | 3/2004 | Keene et al. ........................ | 700/5 |
| 2004/0139396 A1 * | 7/2004 | Gelernter et al. ............. | 715/515 |
| 2004/0237044 A1 * | 11/2004 | Travieso et al. .............. | 715/530 |
| 2005/0240756 A1 * | 10/2005 | Mayer ............................... | 713/2 |
| 2007/0128899 A1 * | 6/2007 | Mayer .......................... | 439/152 |

FOREIGN PATENT DOCUMENTS

EP 0 902 379 A2 * 3/1999

OTHER PUBLICATIONS

Newman et al, "'CamWorks: A Video-based Tool for Efficient Capture from Paper Source Documents," IEEE International Conference on Multimedia Computing and Systems ICMCS, Florence, Italy, Jun. 7-1 I, 1999.*
Rick Borstein, "Acrobat 8 New Features: Redaction", 5 pages (Oct. 5, 2006) available at blogs.adaobe.com/acrolaw/2006/10/acrobat_8_new_f_1/.*

* cited by examiner

*Primary Examiner* — Doug Hutton, Jr.
*Assistant Examiner* — Scott M Kelly
(74) *Attorney, Agent, or Firm* — Kilpatrick Townsend & Stockton LLP

(57) ABSTRACT

A method for graphically designating content in a document for the subsequent application of a redaction function by executing a preview manager process that displays the designated content in a distinctive interactive configuration. The preview manager process renders the interactive configuration in a graphical format that allows a user to distinguish between the designated content (which has been selected by the user for subsequent application of a redaction function) and the remaining non-designated content in the document. Moreover, a user may interact with the designated content in the document such that, upon user activation (e.g., via an input device such as a mouse), the preview manager process renders a preview configuration that displays a simulation of the resultant application of the redaction function to the designated content. A user may further interact with the designated content in the document such that the preview manager process provides an interactive interface (e.g., a dialogue box) for modifying and/or configuring the properties of the redaction function.

20 Claims, 10 Drawing Sheets

PREVIEWING REDACTION CONTENT IN A DOCUMENT

BACKGROUND

Conventional computer systems operate software applications that assist users in document processing and modifying information contained in such documents. Such software applications are commonly used to perform tasks for computer users such as word processing, graphic design, image processing and the like. Typically, these software applications provide users with a variety of tools that facilitate the modification of data within a document. More specifically, conventional software applications provide tools enabling a user to select data, such as text or image data, within a document and to manipulate and/or delete the selected data (e.g., highlighting a text string in a word processing document and subsequently deleting the highlighted text, or changing the font of the highlighted text).

As another example, various conventional software applications include conventional redaction tools that allow a user to modify, or mark-up, text data within a document such that the data is unrecognizable and/or irretrievable by other users who have subsequent access to the document. Generally, such conventional redaction tools modify text within a document resulting in a 'black box' or similar rectangular graphical barrier that serves as a place-filler in lieu of the redacted text. An example application of a conventional software redaction tool involves the redaction of sensitive information contained in electronic documents as part of the discovery phase during litigation in a lawsuit or the removal of classified information from government documents that are released to the public.

Other document processing technologies include various features that allow a user to interact with content within a document via an input device (e.g., a mouse). More specifically, one typical interactive feature (commonly referred to as a "mouse over") is implemented by a user moving a cursor (via an input device such as a mouse) over particular content (e.g., an icon or similar graphical image) in a graphical user interface such that the document processor modifies, manipulates, deletes, etc. the graphical representation of the content and/or displays new content (e.g., a dialogue box) related to the "moused over" content. In turn, when the user moves the cursor away from the content, the document processor returns the particular content to its original graphical representation as displayed before the 'mouse over' processing.

SUMMARY

Conventional software applications that enable a user to redact data in a document suffer from a number of drawbacks. In particular, conventional document processing software applications that contain digital redaction techniques are limited in that these applications do not provide a method for displaying a preview of redacted content before the content is redacted. Furthermore, these conventional software applications do not have the capability to graphically designate particular portions of content within a graphical user interface as content that is marked for future redaction while the user actively edits other content within the document. Thus, conventional document processing software does not offer an intermediate step between the selection of content to be redacted and the actual redaction of that content and, as a result, the user cannot preview a graphical representation of the redaction of content before applying a redaction function to that content.

Another drawback of conventional document processing software results from the inability of conventional redaction software to allow a user to interactively modify properties of the redaction function from within the document. For example, to modify the properties of the application of a redaction function using conventional document processing software, a user would have to make such modifications in a separate application or executable or, at a minimum, the user would have to venture outside the document in a graphical user interface to access the properties of the redaction function (e.g., via drop-down menus, toolbars and/or radio buttons located within the graphical user interface) and the modification of such redaction properties would not be viewable in a "pre-redaction" view of content that is to be redacted. Rather, changing of any redaction properties, if allowed at all, is only reflected in the final document containing redacted content. If a user thus desires to reverse or further change a redaction property, the user must begin again with the original document.

Embodiments disclosed herein significantly overcome such deficiencies and provide a method for graphically designating content in a document for the subsequent application of a redaction function by executing a preview manager process that displays the designated content in a distinct interactive configuration. The preview manager process renders the interactive configuration in a graphical format that allows a user to distinguish between the designated content (which has been selected by the user for subsequent application of a redaction function) and the remaining non-designated content in the document. Moreover, a user may interact with the designated content in the document such that, upon user activation (e.g., via an input device such as a mouse), the preview manager process renders a preview configuration that displays a simulation of the resultant application of the redaction function to the designated content. A user may further interact with the designated content in the document such that the preview manager process provides an interactive interface (e.g., a dialogue box, pull down menu available via right click, or other interactive interface) for modifying and/or configuring the properties of the redaction function in real-time, thus allowing a user to view the redaction property changes on the content before the content is actually fully redacted and made non-visible. Embodiments of the preview manager process disclosed herein therefore substantially overcome the aforementioned drawbacks.

Generally, as in one embodiment disclosed herein, the preview manager process receives an identification of content to be redacted in the graphical user interface. In a typical embodiment, a user identifies content text (e.g., content) by highlighting a text string using a mouse and cursor within the graphical user interface. Alternatively, the user may enter a term in a redaction view, window or frame that is then searched for to find instances of the user specified content within the document. Each instance found in the search may then be selected (or not) for application of a redaction function. In this manner, the user can specify what content in the document is to be "potentially" redacted (i.e., identified for redaction, but for which the redaction function is not yet fully applied). In response to receiving the identification of content to be redacted, the preview manager process automatically renders a first preview configuration of the identified content in the graphical user interface, whereby the first preview configuration indicates that the identified content has been designated for application of a redaction function. The first preview configuration may have a variety of graphical representations which indicate that the identified content has been designated for a future application. Some examples of graphical representations of the first preview configuration include, but are not limited to, a box surrounding the content with an 'X' marked through the inside of the box, a strikethrough notation through the content, a semi-transparent (or semi-opaque) region overlaying the content having a user-defined color property such that the content is still readable and/or recognizable (e.g., a semi-transparent rectangular region overlaying or highlighting the identified content), or any other suitable means for distinguishing this content in a document.

In one embodiment disclosed herein the preview manager process receives user input from an input device (e.g., a mouse), whereby the user input is associated with the identified content in the graphical user interface. For instance, in an example embodiment the preview manager process receives input from a human user when the user manipulates a cursor (via a mouse) over the identified content in the graphical user interface (also known in the art as "mousing over"). As a result to receiving the user input associated with the identified content, the preview manager renders a second preview configuration that represents a simulated application of the redaction function to the identified content in the graphical user interface. In accordance with redaction function software, a typical simulated application of such a redaction function manifests a black rectangular region in the graphical user interface that replaces the region formerly occupied by the identified content having the pre-redacted view (e.g. having the X or highlight or strikethrough as in the first preview configuration of that content. However, since the second preview configuration is merely a simulation of an application of the redaction function, the identified content is not actually redacted and is only visually modified on the graphical user interface to temporarily provide a visual preview of how the graphical user interface will appear upon the actual application of the redaction function. In this manner, when the user specified instance of content in a document to be redacted, each instance can be first shown in a first preview configuration to differentiate this content to be redacted by a redaction symbol such as X, strikethrough or the like. The user can still identify and read content in this "to-be-redacted" region, but this content appears differently than content that is not to be redacted at all. Then, if a user provides input relative to one or more of the content regions that are rendered in the first preview configuration, such as by mousing over one of the "to-be-redacted" regions currently rendered in the first preview configuration, the first preview configuration changes to a second preview configuration that shows what the document body will look like in final form, as if the redaction has already taken place. Thus the content view will change from a still readable form (e.g. a X, highlighted, strikethrough, or the like) to a fully rendition that appears as if the content were actually redacted. This allows the user to preview the final redacted appearance of this content in the document body to see the context of how this redacted content will appear once the redaction is committed-to or actually applied.

In yet another embodiment disclosed herein, the preview manager renders a redaction property interface that defines redaction properties for modifying the redaction function. Redaction properties allow the user to modify information about how the redaction function is to be applied. For example, the redaction properties interface allows a user to change a label or code set applied to the redacted content, and allows a user to modify font size and font choice for the label. Other properties such as color, text, texture, and alignment can be modified as well. Furthermore, in still yet another embodiment of the preview manager process, user modification of the redaction properties affects both the second preview configuration as well as the resultant application of the redaction function. Thus, the preview manager process affords a user an opportunity to preview the modifications to the redaction function properties before implementing the actual redaction function in accordance with embodiments described herein (e.g., by engaging the identified content with a mouse to display the second preview configuration containing the modified redaction properties). In one embodiment, the redaction property interface is a dialogue box that contains various configurable properties for modifying the application of the redaction function. Namely, the configurable redaction properties may include a color property, a texture property and/or a text property, or any other suitable properties related to the graphical representation of redacted content in a document. Additionally, in one embodiment the preview manager has a redaction property interface that includes a code property for the identified content, whereby the code property associates the identified content to a redaction code set. For example, a user may elect to give an identified portion of content a code property of '5' in the redaction property interface, whereby the code property of '5' is associated with all content classified as "top secret". As per one implementation of the preview manager process, a user modifies the text and color properties within the redaction property interface such that the resulting application of the redaction function (and the second preview configuration in accordance with embodiments disclosed herein) renders the text string "REDACTED" in a font with a highlighted background inside the redacted region.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein. Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM, PROM or FPGA chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated® of San Jose, Calif.

BRIEF DESCRIPTION OF THE DRAWINGS

The foregoing and other objects, features and advantages of the invention will be apparent from the following more particular description of embodiments of the methods and apparatus for displaying redaction content in a document, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus for redacting content in a document.

DETAILED DESCRIPTION

Figure 1:
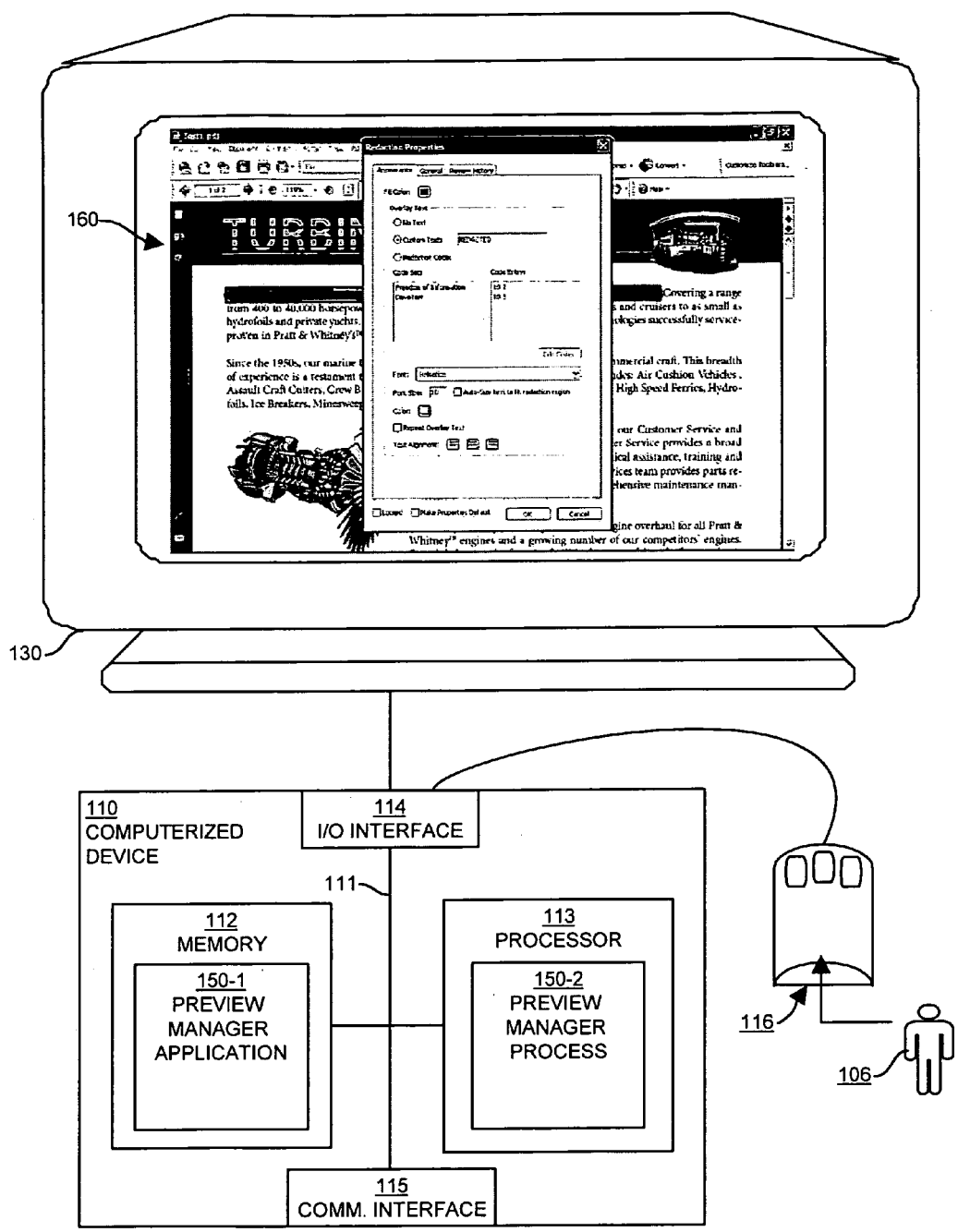
FIG. 1 is a block diagram of a computerized system configured with an application including a preview manager process in accordance with one embodiment of the invention.

FIG. 1 is a block diagram illustrating example architecture of a computer system 110 that executes, runs, interprets, operates or otherwise performs a preview manager application 150-1 and process 150-2 configured in accordance with embodiments of the invention. The computer system 110 may be any type of computerized device such as a personal computer, workstation, portable computing device, console, laptop, network terminal or the like. As shown in this example, the computer system 110 includes an interconnection mechanism 111 such as a data bus, motherboard or other circuitry that couples a memory system 112, a processor 113, an input/output interface 114, and a communications interface 115. An input device 116 (e.g., one or more user/developer controlled devices such as a keyboard, mouse, touch pad, etc.) couples to the computer system 110 and processor 113 through an input/output (I/O) interface 114 and enables a user 106 to provide input signals and generally control a graphical user interface 160 that the preview manager application 150-1 and process 150-2 provides on the computer display 130.

The memory system 112 is any type of computer readable medium and in this example is encoded with a preview manager application 150-1 that supports generation, display, and implementation of functional operations as explained herein. The preview manager application 150-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the preview manager application 150-1. Execution of the preview manager application 150-1 in this manner produces processing functionality in a preview manager process 150-2. In other words, the process 150-2 represents one or more portions or runtime instances of the application 150-1 (or the entire application 150) performing or executing within or upon the processor 113 in the computerized device 110 at runtime.

Generally, the preview manager application 150-1 and process 150-2 (referred to collectively as the preview manager 150) allow a user 106 to select content to be redacted from within the body of a document and, as a consequence, the preview manager provides a variety of interactive pre-redaction tools such that the user 106 can preview and modify the application of a redaction function to the selected content within the document and is able to see how the content to be redacted will appear once redacted (but without committing to the actual redaction at that point). After the user 106 identifies specific content in the document for redaction, the preview manager graphically distinguishes the selected content (e.g., via a peripheral box, strikethrough mark, etc.) from content that has not been selected for redaction within the graphical user interface.

Furthermore, in some configurations the preview manager 150 provides several preview functions in response to user interaction with the selected content (e.g., scrolling over the content using a cursor and mouse within the graphical user interface, "mouse over", and/or engaging the right mouse button, "right-clicking", while the cursor is graphically oriented over the selected content). For instance, upon user interaction (e.g., mouse over) with the selected content, the preview manager 150 renders a second preview configuration of the selected content which displays a simulated application of the redaction function to the region of the graphical user interface with the selected content. In this manner, the user 106 can preview an application of the redaction function in accordance with current redaction property settings to the selected content in the document without having to execute the actual redaction function.

In another configuration the preview manager 150 provides, in response to user interaction with the selected content, a redaction property interface in the form of a dialogue box. With the redaction property interface a user 106 may modify and/or configure a range of properties associated with the application of the redaction function (e.g., color, texture and text properties to name a few). In one embodiment, and in response to a user 106 modifying certain redaction properties via the redaction property interface, the preview manager 150 applies the newly configured properties to both the preview configuration and the redaction.

Further details of configurations explained herein will now be provided with respect to flow charts of processing steps that show the high level operations disclosed herein to perform the preview manager process 150-2, as well as graphical representations that illustrate implementations of the various configurations of the preview manager process 150-2.

Figure 2:
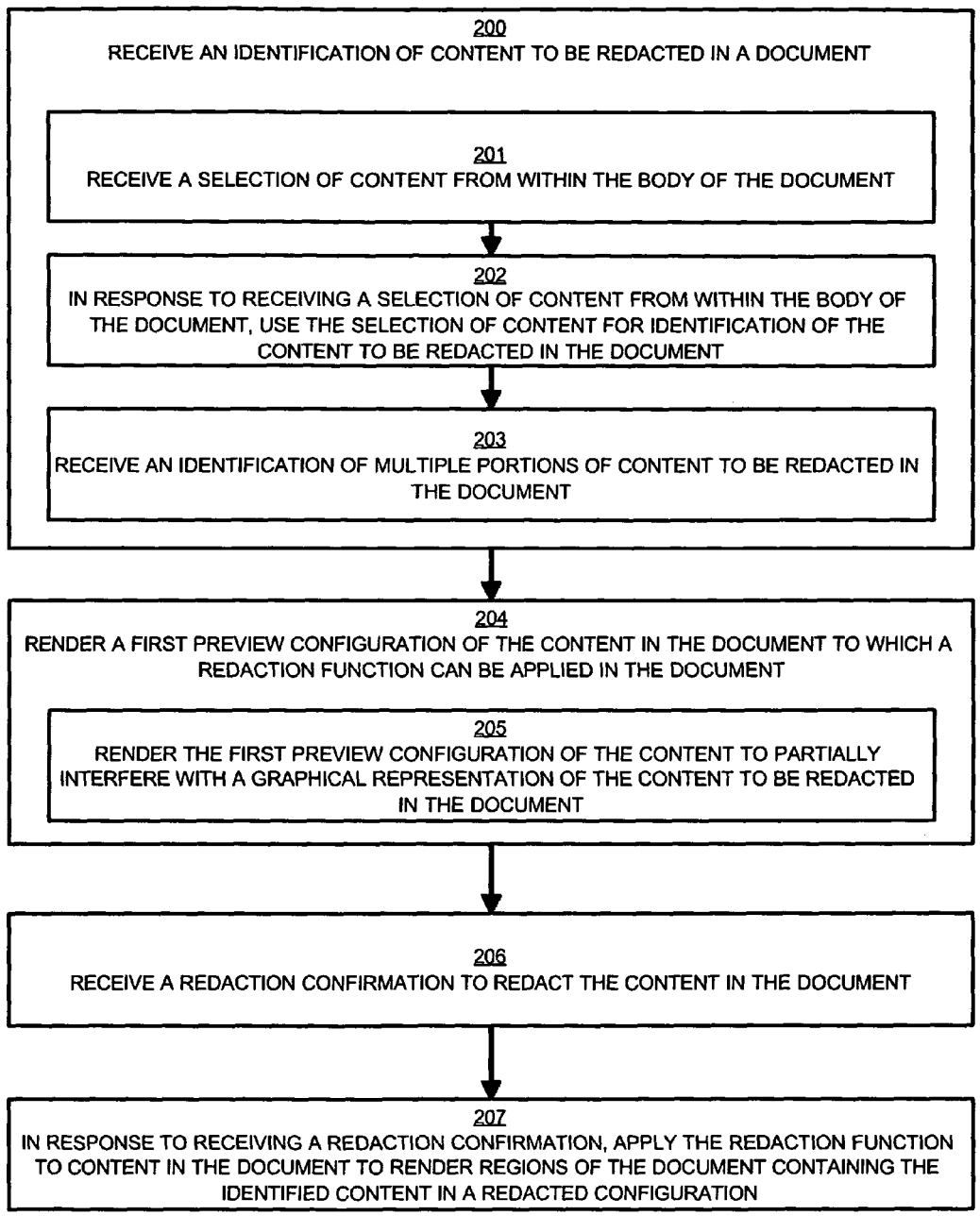
FIG. 2 is a flow chart of processing steps that shows high-level processing operations performed by the preview manager process when it processes document data in accordance with one example configuration of the invention.

FIG. 2 is a flow chart of processing steps that shows high-level processing operations performed by the preview manager 150 when it identifies a second portion of content in a target layer in accordance with one example configuration.

In step 200, the preview manager 150 receives an identification of content to be redacted 171 in a document 162. Typically, a human user 106 provides the preview manager 150 with the identification of content to be redacted 171 within the document. However, the scope of the invention further contemplates the reception of the identification of content to be redacted 171 from other sources such as a separate process running on the same or a different computerized device or, in various situations, the preview manager 150 provides the identification of content to be redacted 171 within the document 162.

In step 201, the preview manager 150 receives a selection of content 171 from within the document (e.g., the display area 161). For example, in one embodiment the preview manager 150 receives a selection of text 171 that has been highlighted by a user manipulating a mouse and cursor within the graphical user interface 160.

Figure 3:
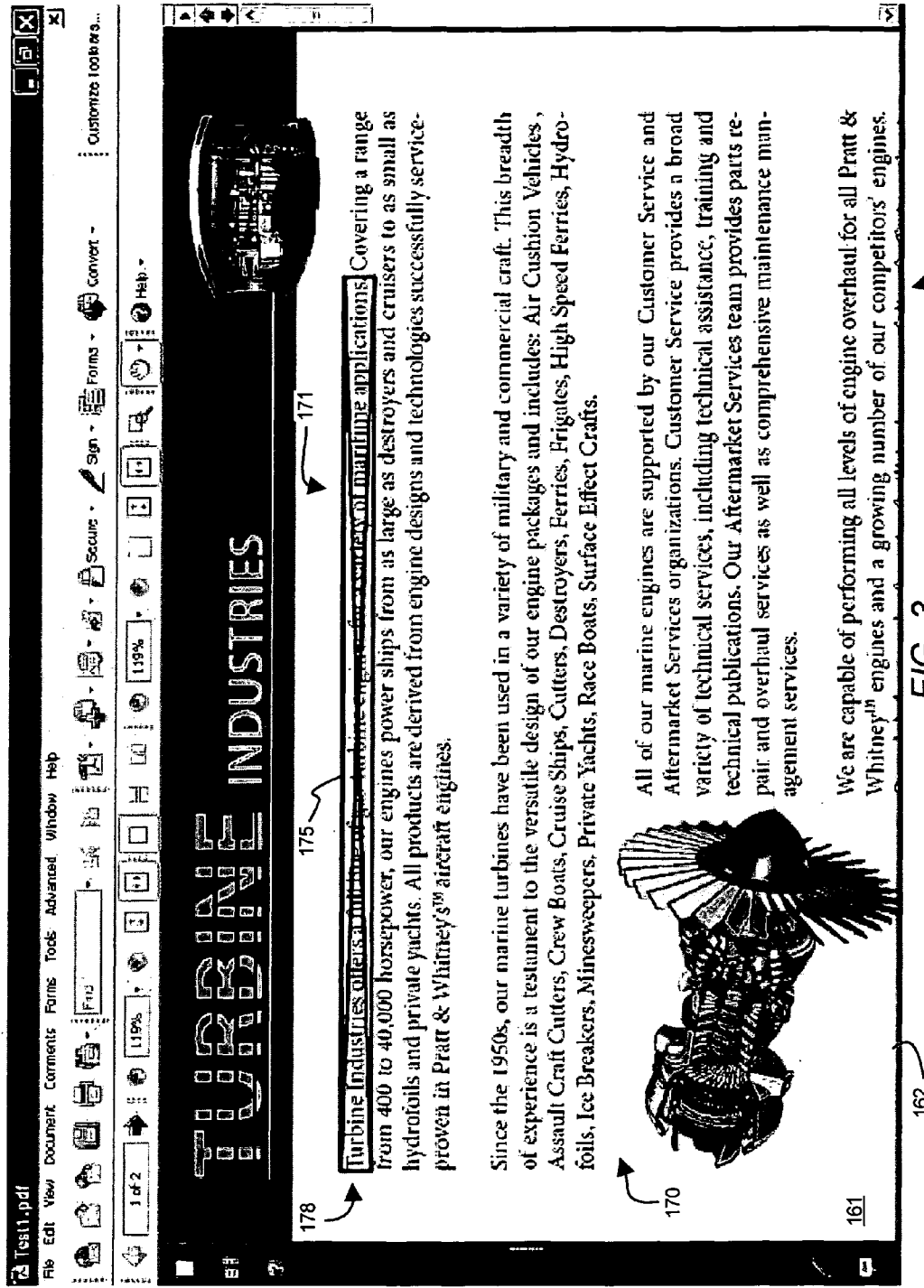
FIG. 3 is a graphical representation that illustrates one implementation of the preview manager process when it renders a first preview configuration in the graphical user interface.

FIG. 3 is an illustration of an example implementation of the preview manager 150 with a graphical user interface 160 and display area 161. Contained in the display area 161 of the graphical user interface 160 is content 170 in the form of text and image data. In this example configuration, the preview manager 150 receives a selection of content 171 from a user 106 in the document (or display area 161).

In step 202, in response to the reception of a selection of content 171, the preview manager 150 uses the selection of content for identification of the content to be redacted 171 in the document 162.

Figure 4:
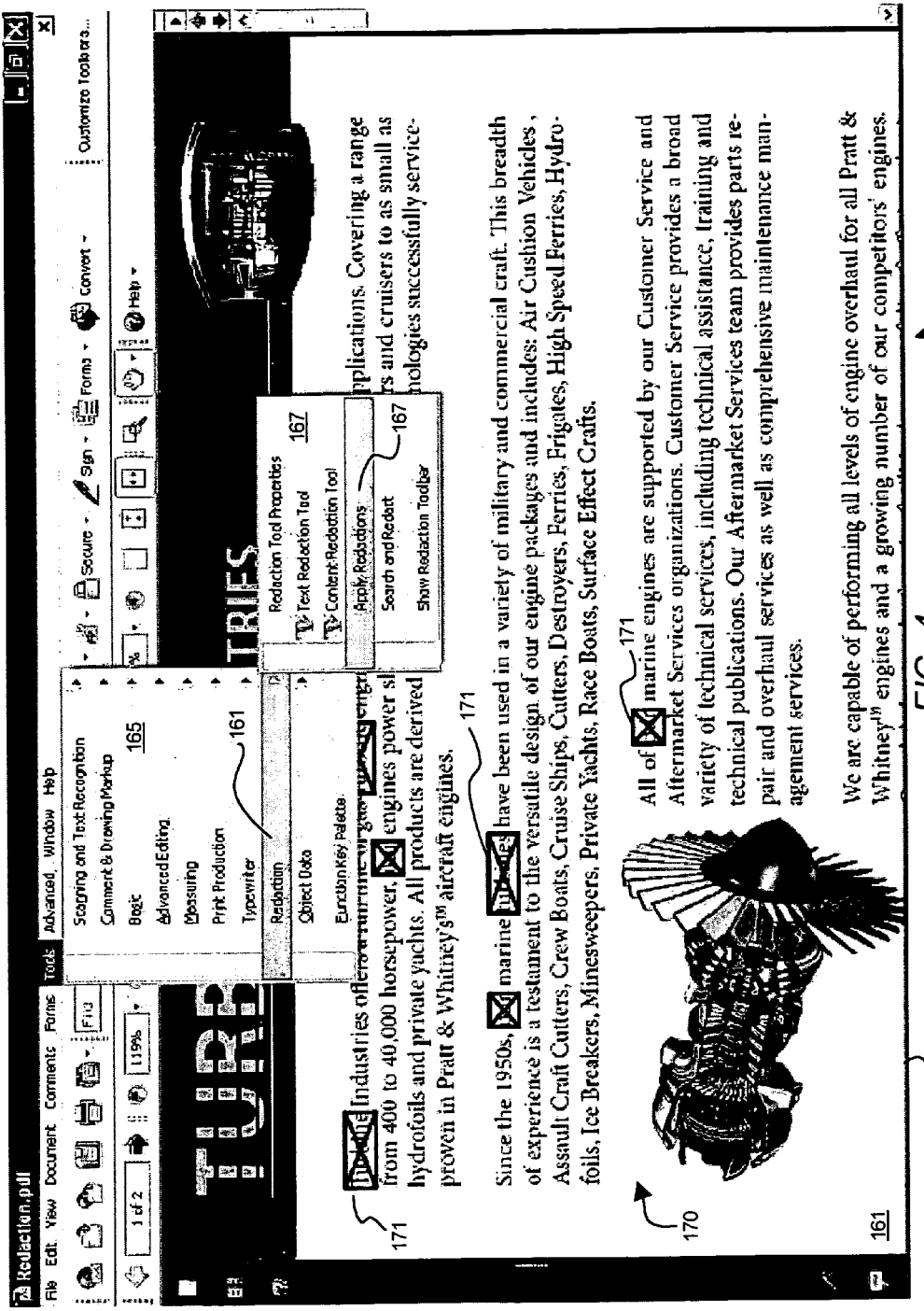
FIG. 4 is a graphical representation that illustrates one implementation of the preview manager process when it renders a redaction drop-down menu with a redaction commitment option in the graphical user interface.

In step 203, the preview manager 150 receives an identification of multiple portions of content to be redacted 171 in the document 162. The multiple portions of content may be different types of content (e.g., text, graphics, images, tables, charts, etc.) located anywhere within the document. For example, a user 106 may select a text string on the first page of a document and then select a corresponding image on the third page of the document as content to be redacted 171. For example, FIG. 4 shows an example embodiment of the preview manager 150 whereby multiple portions of content to be redacted 171 have been selected by a user 106 in the graphical user interface 160. In one implementation, a user 106 may select multiple portions of content by depressing either the 'Shift' or 'Control'/'Ctrl' buttons on a standard keyboard while separately highlighting each portion of content to be redacted 171.

In step 204, the preview manager 150 automatically renders a first preview configuration 175 of the content in the document (e.g., display area 161) to which a redaction function can be applied in the document 162. In its application, the first preview configuration 175 graphically distinguishes the selected content 171 from the remaining content 170 in the document 162 that has not been selected for redaction. As will be discussed further, the first preview configuration 175 may consist of a variety of formats (e.g., a strikethrough mark overlaying the identified content) suitable for graphically distinguishing content in a document.

In step 205, the preview manager 150 renders the first preview configuration 175 of the content to partially interfere with a graphical representation of the content to be redacted 171 in the document 162. The partial interference paradigm of the first preview configuration 175 is meant to graphically designate and distinguish the content to be redacted 171 while, at the same time, allow a user 106 to recognize the content that has been selected for redaction in the midst of the partial interference. As shown in the example embodiment in FIG. 3, the preview manager 150 has rendered a first preview configuration 175 (e.g., a peripheral box with an 'X' through the inside of the box) that partially interferes with the content to be redacted 171. In this example, although the content to be redacted 171 (e.g., the text string in the graphical user interface 160) has been obscured by the first preview configuration 175, the content is still recognizable such that a user 106 could determine the identity of the content.

In step 206, the preview manager 150 receives a redaction confirmation 168 to redact the content in the document 162. To demonstrate this, FIG. 4 shows an example implementation of the preview manager 150 rendering a graphical user interface 160 within display area 161. The graphical user interface 160 includes a drop down menu 165 with a 'redaction' option 166 that provides a suite of redaction tools 167. In addition, the suite of redaction tools 167 includes the redaction commitment 168 option. The highlighted area emphasizing the "Apply Redactions" option (e.g., the redaction commitment 168) in the drop down menu 165 indicates that a user 106 has selected the redaction commitment 168 in order to apply the redaction function to the content to be redacted 171.

Figure 5:
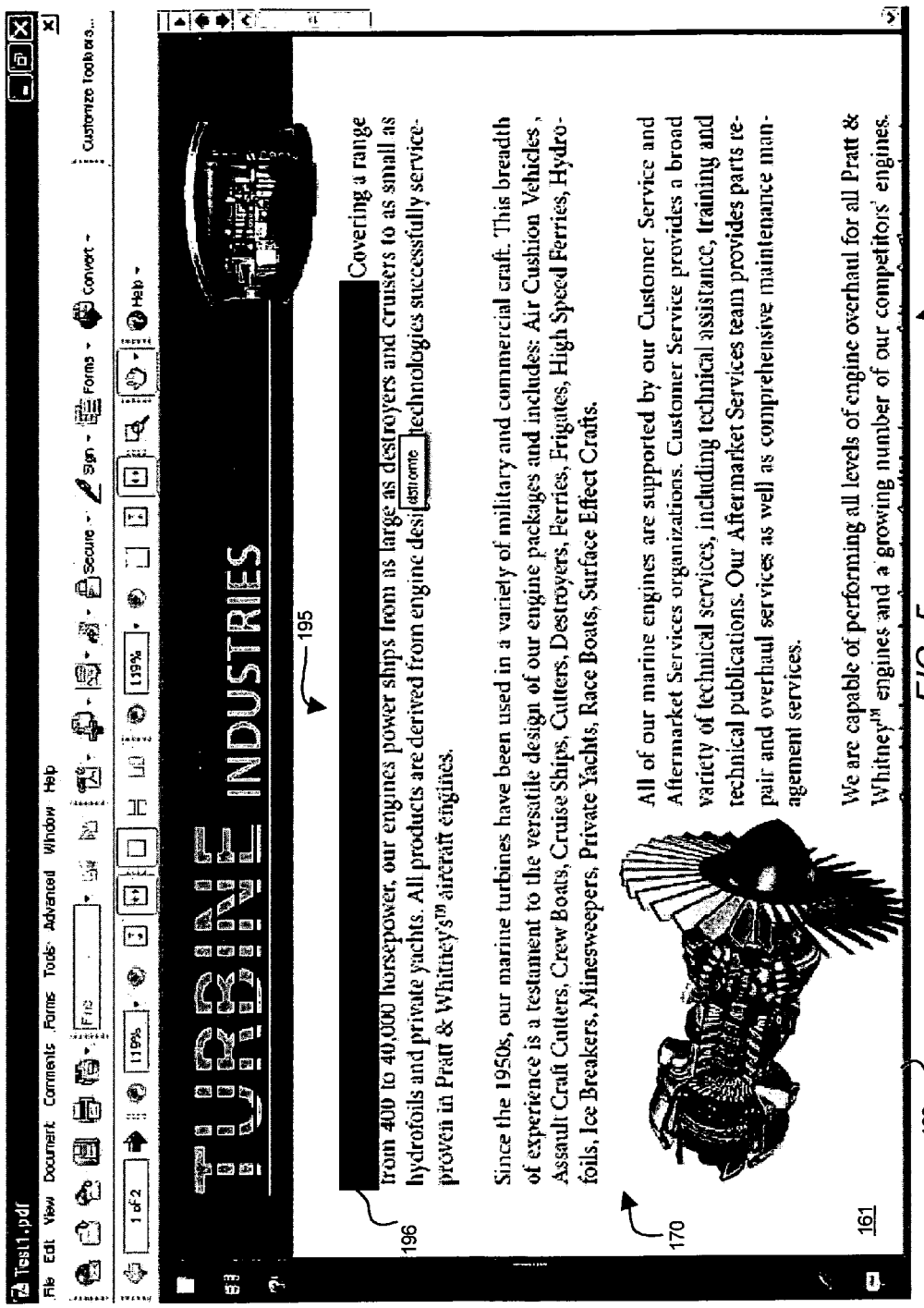
FIG. 5 is a graphical representation that illustrates one implementation of the preview manager process when it applies a redaction function to the content to be redacted in the graphical user interface.

In step 207, in response to receiving the redaction commitment 168, the preview manager 150 applies the redaction function to content in the document to render regions of the document containing the identified content in a redacted configuration 196. FIG. 5 shows an example implementation of the preview manager 150 after a redaction function has been applied to the selected content within the graphical user interface 160. The redacted content 195 in this embodiment is graphically represented by a shaed or black or otherwise highlighted rectangular box (e.g., the redaction configuration 196) replacing the region in the graphical user interface 160 formerly occupied by the content to be redacted 171.

Figure 6:
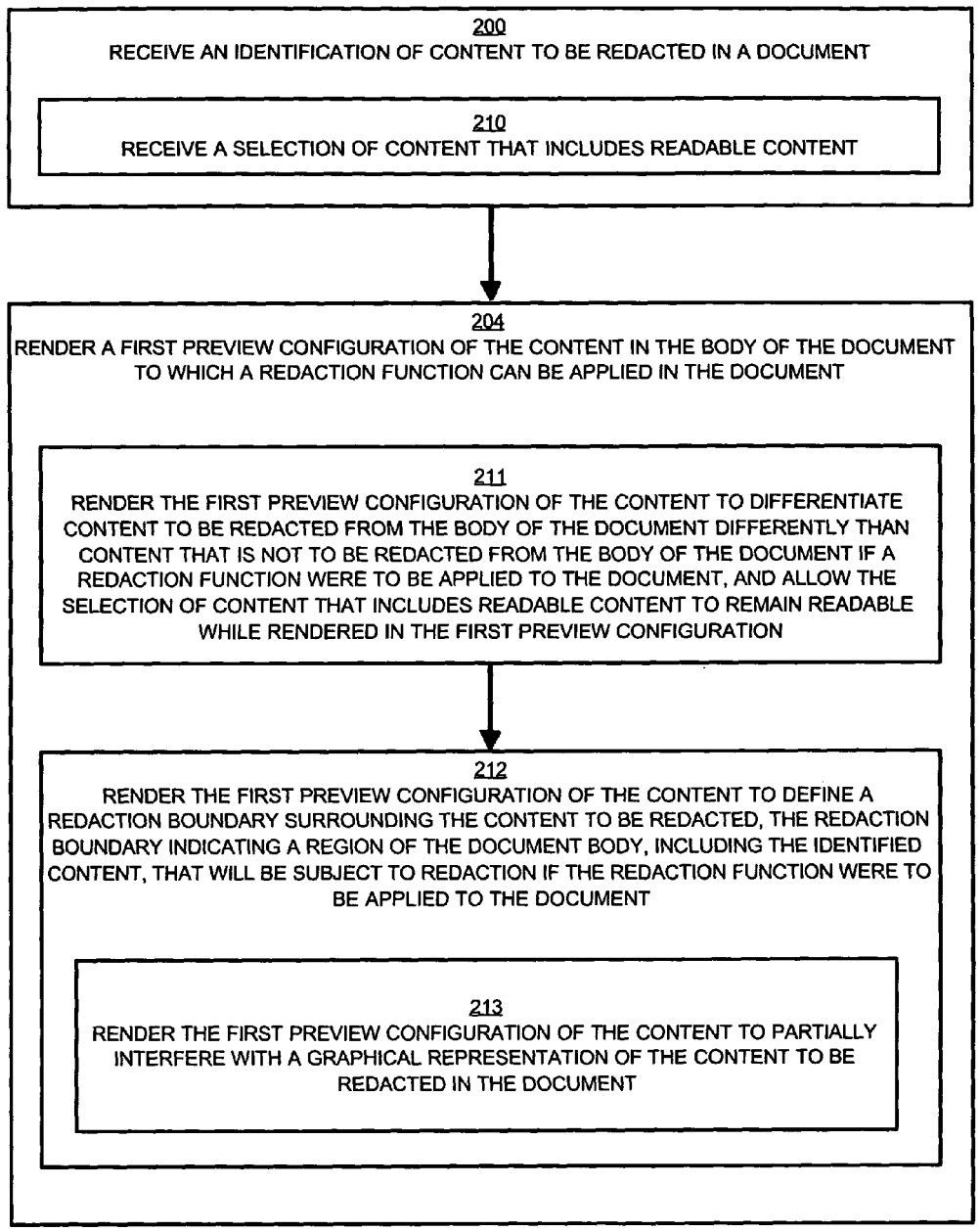
FIG. 6 is a flow chart of processing steps that shows high-level processing operations performed by the preview manager process when it renders a first preview configuration in accordance with one example configuration of the invention.

FIG. 6 is a flow chart of processing steps that shows high-level processing operations performed by the preview manager 150 when it identifies a second portion of content in a target layer in accordance with one example configuration.

In step 210, the preview manager 150 receives a selection of content that includes readable content. Generally, the readable content is editable text within the document. However, the readable content may also include text as part of an image or graphic embedded in the document (e.g, the image text 199 "TURBINE INDUSTRIES" depicted in the top of the graphical user interface 160 in FIG. 5).

In step 211, the preview manager 150 renders the first preview configuration 175 of the content to differentiate content to be redacted 171 from the document 162 differently than content that is not to be redacted from the document if a redaction function were to be applied to the document 162, and allowing the selection of content that includes readable content to remain readable while rendered in the first preview configuration 175.

In step 212, the preview manager 150 renders the first preview configuration 175 of the content to define a redaction boundary 178 surrounding the content to be redacted, the redaction boundary 178 indicating a region of the document body (e.g., display area 161), including the identified content, that will be subject to redaction if the redaction function were to be applied to the document 162. In referencing the first preview configuration 175 (the peripheral box with an 'X' marked through the middle) depicted in FIG. 3, the peripheral box defines a redaction boundary 178 surrounding the content to be redacted 171 and indicates a region of the document body that is subject to redaction by an application of the redaction function.

In an alternate embodiment, the preview manager 150 renders a first preview configuration 175 as a semi-transparent (or semi-opaque) rectangular region (having any user-defined color or tint) overlaying the content to be redacted 171. In this manner, the content to be redacted 171 is differentiated from the content 170 that has not been selected for redaction in the document while also remaining readable to a user 106 viewing the document 162. Other similar formats may also be implemented such as, for example, enclosing the content to be redacted 171 in parentheses, rendering the content (e.g., editable text) in a different color, rendering the content (e.g., editable text) in a different font, and/or any combination thereof, or other similar means for distinguishing content in a document such that the content remains readable to a user 106 viewing the document 162.

In step 213, the preview manager 150 renders the first preview configuration 175 of the content to partially interfere with a graphical representation of the content to be redacted 171 in the document 162. The preview manager 150 renders the first preview configuration 175 to partially interfere with the graphical representation of the content to be redacted 171 in accordance with embodiments previously disclosed herein.

Figure 7:
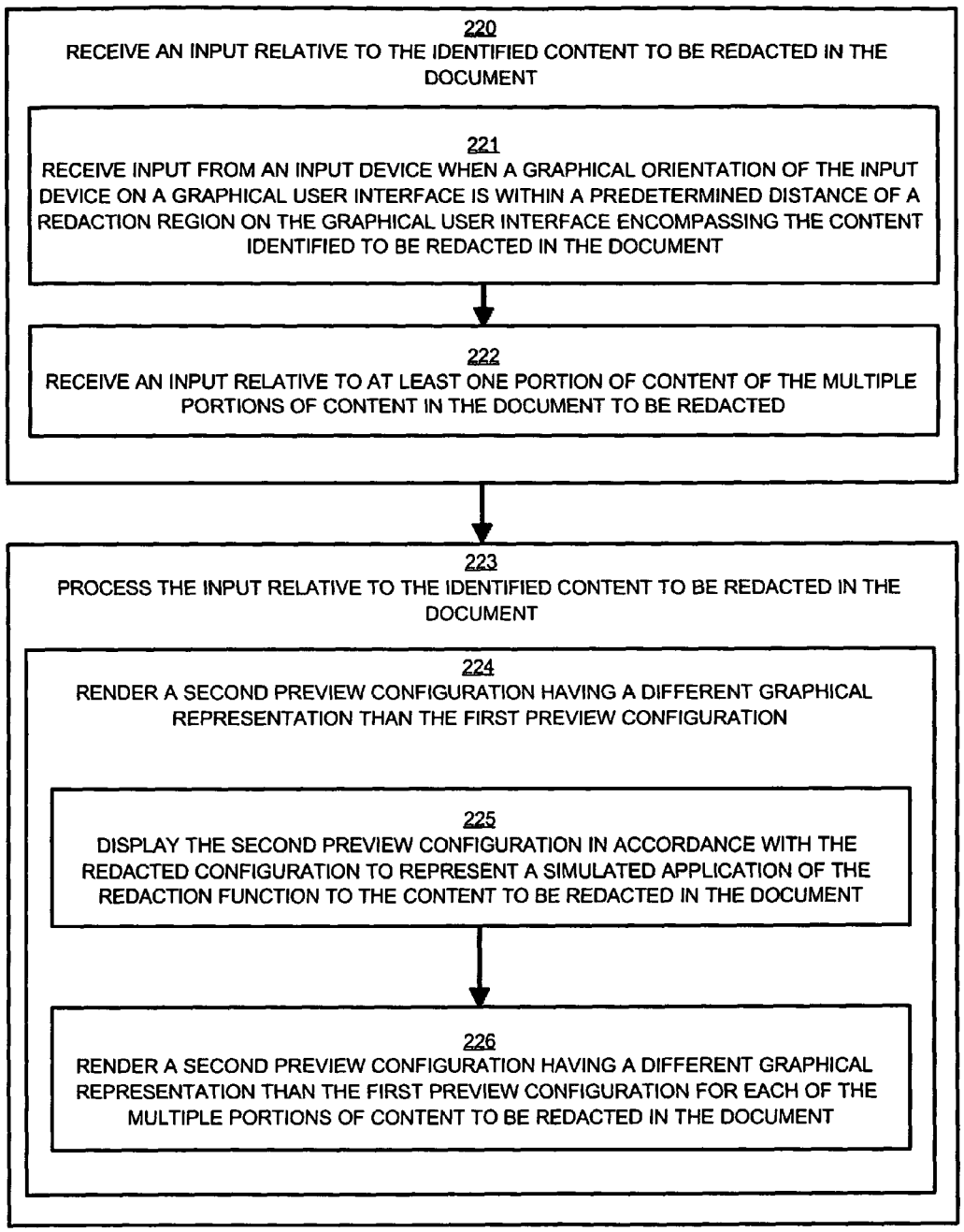
FIG. 7 is a flow chart of processing steps that shows high-level processing operations performed by the preview manager process when it renders a second preview configuration in accordance with one example configuration of the invention.

FIG. 7 is a flow chart of processing steps that shows high-level processing operations performed by the preview manager 150 when it identifies a second portion of content in a target layer in accordance with one example configuration.

In step 220, the preview manager 150 receives an input relative to the identified content to be redacted 171 in the document 162. Thus, after the content to be redacted 171 has been identified, the preview manager 150 receives a subsequent input related to the previously identified content.

In step 221, the preview manager 150 receives input from an input device 116 when a graphical orientation of the input device 116 on a graphical user interface 160 is within a predetermined distance of a redaction region 179 on the graphical user interface 160 that encompasses the content to be redacted 171 in the document 162. More specifically, in one embodiment the preview manager 150 receives an input when a user 106 manipulates the input device over the redaction region with a cursor and a mouse in the graphical user interface 160 (also referred to as "mousing over"). As a result, the input received by the preview manager 150 relates to the content to be redacted 171 in the redaction region 162.

In step 222, the preview manager 150 receives an input relative to at least one portion of content of the multiple portions of content to be redacted 171 in the document 162. Thus, in accordance with this embodiment, if multiple portions of content have been identified as content to be redacted 171 in the document (e.g., display area 161), the preview manager 150 may receive input related to at least one portion of content in the graphical user interface 160.

In step 223, the preview manager 150 processes the input relative to the identified content to be redacted 171 in the document 162. As will be discussed in more detail, the processing of the input by the preview manager 150 is multi-faceted and provides a user 106 with various options for interacting with the content to be redacted 171.

In step 224, the preview manager 150 renders a second preview configuration 176 having a different graphical representation than the first preview configuration 175. The second preview configuration 176 may vary in size, shape, color, texture and the like, so as to maintain a different appearance in the graphical user interface 160 than the first preview configuration 175.

In step 225, the preview manager 150 displays the second preview configuration 176 in accordance with the redacted configuration 196 to represent a simulated application of the redaction function to the content to be redacted in the document 162. This step allows a user 106 to quickly preview an application of the redaction function to the content to be redacted 171 without having to actually apply the redaction function to the content 170 in the graphical user interface 160. According to one example embodiment, and in response to a user 106 manipulating a cursor (via an input device 116 such as a mouse) over content to be redacted 171, the preview manager 150 renders a second preview configuration 176 that graphically replicates an actual application of the redaction function to the content to be redacted (e.g., the second preview configuration 176 has a substantially similar graphical representation to the redaction configuration 196, for example, a solid black rectangular box in the redaction region). Additionally, when the user 106 moves the cursor (via the mouse) away from the redaction region 179 in the graphical user interface 160, the preview manager 150 redisplays the first preview configuration 175 in relation to the content to be redacted 171.

Figure 8:
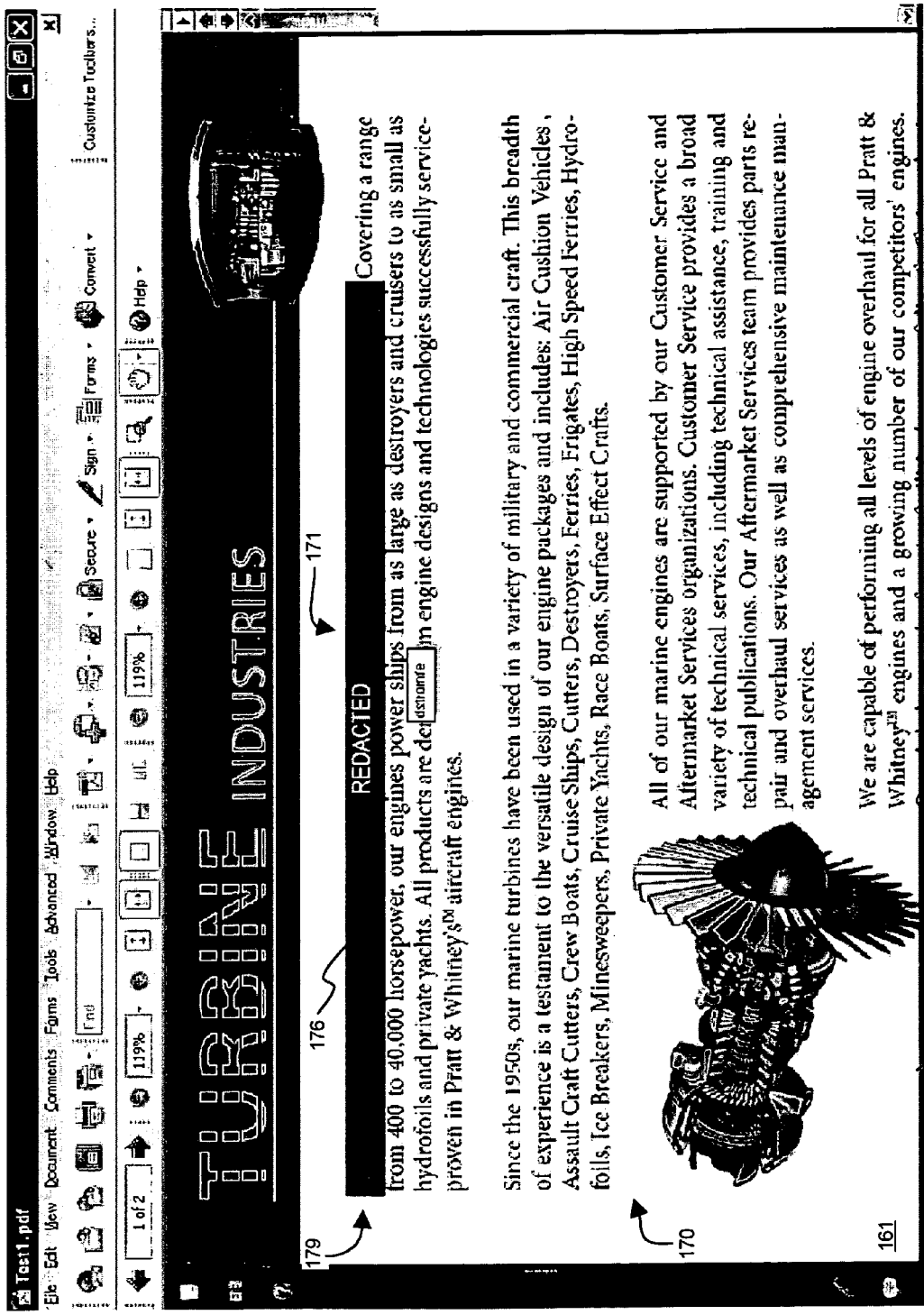
FIG. 8 is a graphical representation that illustrates one implementation of the preview manager process when it renders a second preview configuration in the graphical user interface.

FIG. 8 is an illustration of an example implementation of the preview manager 150 with graphical user interface 160 and display area 161. The display area 161 contains content 170 and a redaction region 179 that encompasses content to be redacted 171 (not shown). Assume that in this example embodiment a user 106 has provided input to the preview manager 150 by moving a cursor over the redaction region 179 using an input device 116 (e.g., a mouse). In response to receiving this input, the preview manager 150 renders a second preview configuration 176 in accordance with a simulated application of the redaction function to the redaction region 179. If the user 106 were to move the cursor away from the redaction region 179, the preview manager 150 would recognize this input and automatically redisplay the first preview configuration 175 in the redaction region 179 (see the example illustration of the first preview configuration 175 as shown in FIG. 3).

In step 226, the preview manager 150 renders a second preview configuration 176 having a different graphical representation than the first preview configuration 175 for each of the multiple portions of content to be redacted 171 in the document 162. In the case where multiple portions of content in the document have been identified as content to be redacted 171, the preview manager 150 renders a second preview configuration 176 for all such portions of content when input has been received in relation to at least one portion of content in the graphical user interface 160. In an example embodiment, assume that five text strings (e.g., social security numbers) have been identified as content to be redacted 171 in the body of a document and the preview manager 150 has received input relative to only one text string (e.g., the user graphically manipulated the cursor over one of the social security numbers with a mouse). As a result, the preview manager 150 renders a second preview configuration 176 (more specifically a simulated application of the redaction function as previously disclosed herein) for all five text strings (e.g., all five social security number in this example implementation). Furthermore, upon detecting that the cursor has moved away from the impacted (or "moused over") text string, the preview manager 150 redisplays the first preview configuration 175 for all five text strings.

Figure 9:
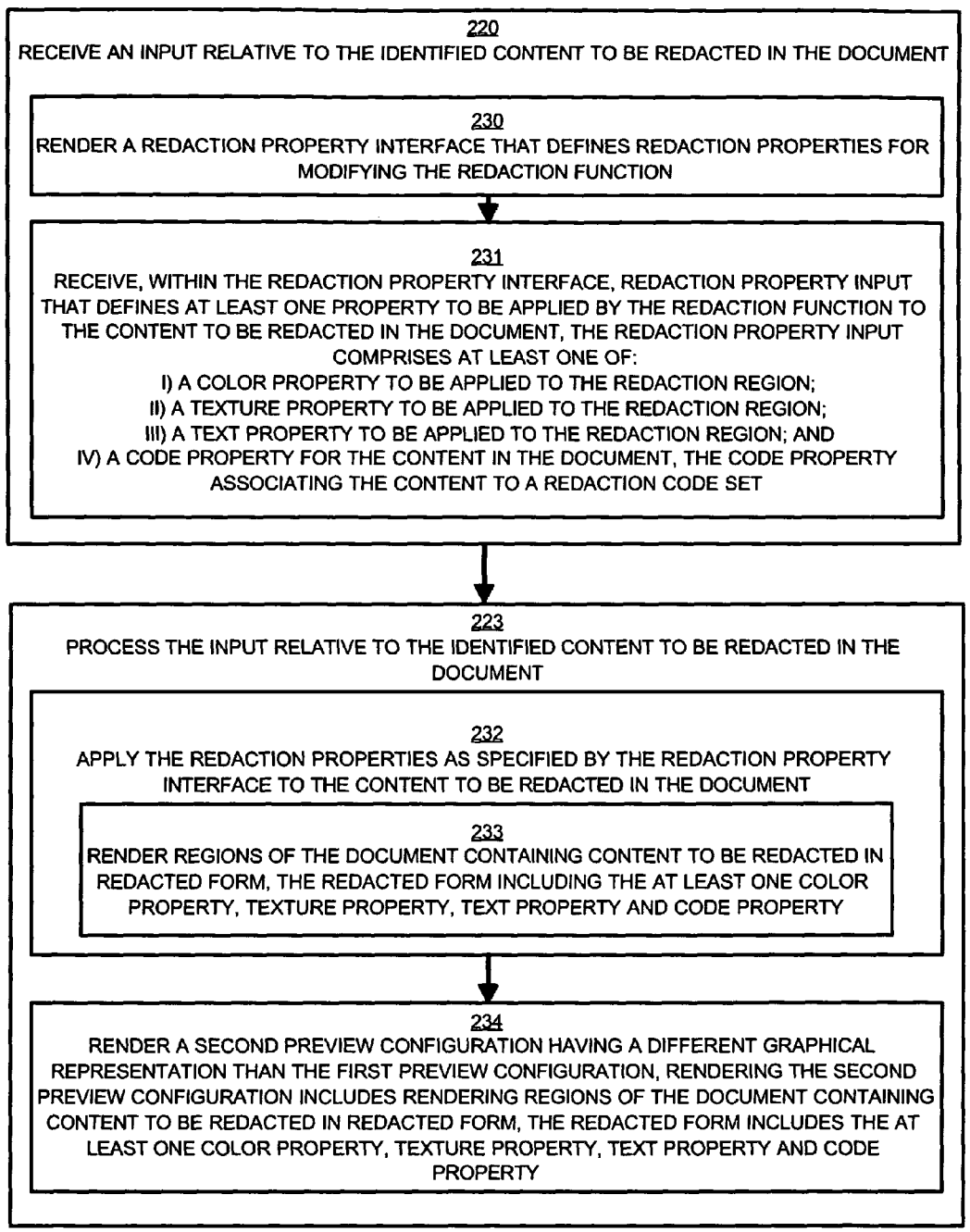
FIG. 9 is a flow chart of processing steps that shows high-level processing operations performed by the preview manager process when it renders a redaction property interface in accordance with one example configuration of the invention.

FIG. 9 is a flow chart of processing steps that shows high-level processing operations performed by the preview manager 150 when it identifies a second portion of content in a target layer in accordance with one example configuration.

In step 230, the preview manager 150 renders a redaction property interface 180 that defines redaction properties for modifying the redaction function. Typically, the redaction property interface 180 is a dialogue box (or similar interactive graphical user interface) that contains various configurable properties for modifying the application of the redaction function. In one embodiment, the preview manager 150 renders the redaction property interface 180 as a dialogue box in a separate graphical user interface. In an alternate embodiment, the preview manager 150 renders the redaction property interface 180 as a separate window inside the graphical user interface 160.

Figure 10:
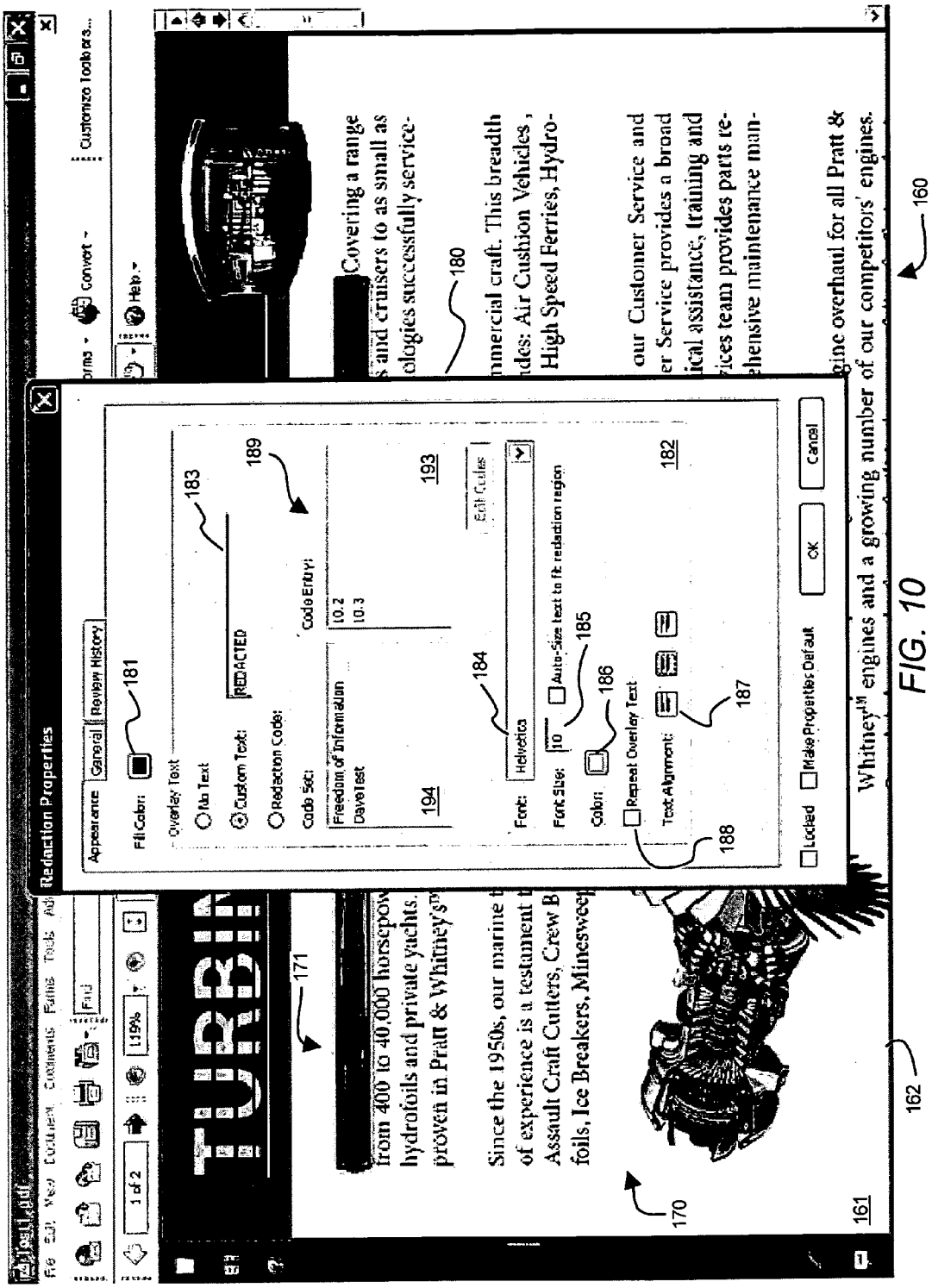
FIG. 10 is a graphical representation that illustrates one implementation of the preview manager process when it renders a redaction property interface in the graphical user interface.

In step 231, the preview manager 150 receives, within the redaction property interface 180, redaction property input that defines at least one property to be applied by the redaction function to the content to be redacted 171 in the document 162. The redaction property input comprises at least one of: i) a color property, ii) a texture property, iii) a text property, and iv) a code property 193 associating the content to a redaction code set. FIG. 10 depicts an example configuration of the preview manager 150 displaying a redaction property interface 180 as a dialogue box. Contained in the dialogue box is a fill color selector 181 that allows a user 106 to select a respective fill color for the inside of the redacted configuration 196 (e.g., a user 106 may select from a graphical palette of colors). The redaction property interface 180 also contains a text configuration region 182 that allows a user 106 to customize a text selection to be displayed inside the redaction region upon application of the redaction function. A user 106 may enter a text string (e.g., "REDACTED" as shown in FIG. 10) into the custom text field 183 for subsequent insertion into the redaction region upon application of the redaction function. In addition, a user 106 may further customize the text selection with the font type selector 184 (e.g., Times New Roman, Arial, etc.), font size selector 185, font color selector 186, text alignment selector 187 (e.g., align top, align left, align center, etc.) and repeat text selector 188. Upon activation of the repeat text selector 188, the preview manager 150 populates the redacted configuration 196 with instances of the text string entered into the custom text field 183. The instances of the text string inside the redacted configuration 196 are separated by a predetermined horizontal and vertical pixel buffer (e.g., 25 pixel horizontal buffer and 15 pixel vertical buffer) to preserve readability and avoid a crowded appearance within the redacted configuration 196

In reference to the example embodiment shown in FIG. 10, the text configuration region 182 in the redaction property interface 180 also contains a redaction code handler 189 that allows a user 106 to assign a code property 193 and associated code set identifier 194 to a selection of content to be redacted 171. In the example configuration illustrated in FIG. 10, a user 106 has assigned a code property 193 of "10.2" (associated with the "Freedom of Information" code set identifier 194) and a code property 193 of "10.3" (associated with the "DaveTest" code set identifier 194) to the content to be redacted 171 in the graphical user interface 160. By assigning a code property 193 to particular content to be redacted 171, a user 106 may later determine, among other things, the origin of redaction (e.g., the user who implemented the redaction function) and/or the motivation for redacting certain content from the document.

In step 232, the preview manager 150 applies the redaction properties as specified by the redaction property interface 180 to the content to be redacted 171 in the document 162 (e.g., in the form of metadata associated with the respective content to be redacted 171).

In step 233, the preview manager 150 renders regions of the document containing content to be redacted 171 in redacted form 196 (also referred to herein as the redacted configuration), whereby the redacted form 196 includes the at least one color property, texture property, text property and code property 193. In the example configuration depicted in FIG. 5, the preview manager 150 renders the redaction region (or redaction boundary 178 according to certain embodiments) containing the content to be redacted 171 in redacted form 196. As can be seen in this figure, the redacted form has a black color property, a solid texture property and no text or code properties.

In step 234, the preview manager 150 renders a second preview configuration 176 having a different graphical representation than the first preview configuration 175, whereby rendering the second preview configuration 176 includes rendering regions of the document 162 containing content to be redacted 171 in redacted form 196 including the at least one color property, texture property, text property and code property 193. In this manner, the graphical appearance of the second preview configuration 176 is commensurate with the application of the redaction function to content in accordance with the user-defined and/or default redaction properties configured in the redaction property interface 180.

It is noted that example configurations disclosed herein include the preview manager application 150-1 itself (i.e., in the form of un-executed or non-performing logic instructions and/or data). The preview manager application 150-1 may be stored on a computer readable medium (such as a floppy disk), hard disk, electronic, magnetic, optical or other computer readable medium. The preview manager application 150-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the preview manager application 150-1 in the processor 113 as the preview manager process 150-2. In another alternative configuration, the preview manager process 150-2 may be embedded in the operating system or may operate as a separate process from the application and may track all user input or only some user input (such as mouse movement or clicks, but not keyboard input). Those skilled in the art will understand that the computer system 110 may include other processes and/or software and hardware components, such as an operating system not shown in this example.

Referring now to FIG. 2 in conjunction with FIG. 1, a typical tunneling protocol packet is shown having a payload section 15, tunnel header section 16 and IP header_1 section 17. In this example embodiment, payload section 15 includes an IP control channel section 18 (containing IP control channel data such as BFD data) and IP header_2 19. The payload section 15 is the organic information received by ingress router P1 in network 10 from client edge router C1 in private network 11.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

What we claim is:

1. A method comprising:
   displaying content from a document on a display device;
   displaying selection markings on a selected portion of the content in response to receiving a selection of the selected portion, the selection markings indicating the selected portion is marked for redaction from the document;
   receiving a first movement onto the selected portion by receiving a first user device input;
   in response to the first movement onto the selected portion, displaying the selected portion as redacted without redacting the selected portion in the document, wherein displaying the selected portion as redacted comprises displaying redaction markings in place of the selected portion, the redaction markings different than the selection markings;
   while displaying the selected portion as redacted, receiving a second movement off of the selected portion by receiving a second user device input; and
   in response to the second movement off of the selected portion, discontinuing display of the redaction markings and redisplaying the selected portion.

2. The method of claim 1 wherein the first user device input moves a cursor over the selected portion.

3. The method of claim 1 wherein a single user device provides both the first user device input and the second user device input, wherein the single user device is a mouse.

4. The method of claim 1 wherein a single user device provides both the first user device input and the second user device input, wherein the single user device is a touch screen.

5. The method of claim 1 further comprising:
   receiving a redaction command; and
   in response to receiving the redaction command:
      redacting the selected portion, and
      displaying the redaction markings indicating the redaction of the selected portion.

6. The method of claim 5, wherein redacting the selected portion deletes the selected portion from the content.

7. The method of claim 1 wherein:
   displaying the selected portion as redacted discontinues the displaying of the selection markings on the selected portion; and
   redisplaying the selected portion redisplays the selection markings on the selected portion.

8. The method of claim 1, wherein the selection markings comprise a boundary surrounding the selected portion.

9. The method of claim 1, wherein the selection markings partially obscure the selected portion.

10. The method of claim 1, wherein the redaction markings are based on redaction configuration parameters, the redaction parameters comprise at least one of a color parameter, a texture parameter, or a text parameter.

11. A non-transitory computer-readable medium comprising program code, the program code comprising:
    program code for displaying content from a document on a display device;
    program code for displaying selection markings on a selected portion of the content in response to receiving a selection of the selected portion, the selection markings indicating the selected portion is marked for redaction from the document;
    program code for receiving a first movement onto the selected portion by receiving a first user device input;
    program code for, in response to the first movement onto the selected portion, displaying the selected portion as redacted without redacting the selected portion in the document, wherein displaying the selected portion as redacted comprises displaying redaction markings in place of the selected portion, the redaction markings different than the selection markings;
    program code for, while displaying the selected portion as redacted, receiving a second movement off of the selected portion by receiving a second user device input; and
    program code for, in response to the second movement off of the selected portion, discontinuing display of the redaction markings and redisplaying the selected portion.

12. The non-transitory computer-readable medium of claim 11 wherein the first user device input moves a cursor over the selected portion.

13. The non-transitory computer-readable medium of claim 11 wherein a single user device provides both the first user device input and the second user device input, wherein the single user device is a mouse.

14. The non-transitory computer-readable medium of claim 11 wherein a single user device provides both the first user device input and the second user device input, wherein the single user device is a touch screen.

15. The non-transitory computer-readable medium of claim 11 further comprising:
    program code for receiving a redaction command; and
    program code for, in response to receiving the redaction command, redacting the selected portion and displaying the redaction markings indicating the redaction of the selected portion.

16. The non-transitory computer-readable medium of claim 15, wherein the program code for redacting the selected portion is configured to delete the selected portion from the content.

17. The non-transitory computer-readable medium of claim 11, wherein:
    the program code for displaying the selected portion as redacted is configured to discontinue the displaying of the selection markings on the selected portion; and
    the program code for redisplaying the selected portion is configured to redisplay the selection markings on the selected portion.

18. The non-transitory computer-readable medium of claim 11, wherein the selection markings comprise a boundary surrounding the selected portion.

19. The non-transitory computer-readable medium of claim 11, wherein the selection markings are configured to partially obscure the selected portion.

20. The non-transitory computer-readable medium of claim 11 wherein the redaction markings are based on redaction configuration parameters, the redaction parameters comprise at least one of a color parameter, a texture parameter, or a text parameter.

* * * * *

UNITED STATES PATENT AND TRADEMARK OFFICE
CERTIFICATE OF CORRECTION

Page 1 of 1

PATENT NO. : 8,584,005 B1
APPLICATION NO. : 11/477041
DATED : November 12, 2013
INVENTOR(S) : Pittenger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2145 days.

Signed and Sealed this
Fourteenth Day of April, 2015

Michelle K. Lee
*Director of the United States Patent and Trademark Office*